US008463641B2

(12) United States Patent
Reddy

(10) Patent No.: US 8,463,641 B2
(45) Date of Patent: Jun. 11, 2013

(54) METHOD AND SYSTEM USING LINEAR PROGRAMMING FOR ESTIMATING TEST COSTS FOR BAYESIAN DIAGNOSTIC MODELS

(75) Inventor: Sudhakar Y. Reddy, Santa Clara, CA (US)

(73) Assignee: The Boeing Company, Chicago, IL (US)

( * ) Notice: Subject to any disclaimer, the term of this patent is extended or adjusted under 35 U.S.C. 154(b) by 1123 days.

(21) Appl. No.: 11/868,245

(22) Filed: Oct. 5, 2007

(65) Prior Publication Data

US 2009/0094076 A1 Apr. 9, 2009

(51) Int. Cl.
*G06Q 10/00* (2012.01)

(52) U.S. Cl.
USPC ............. 705/7.41; 705/7.11; 705/7.38; 714/1

(58) Field of Classification Search
None
See application file for complete search history.

(56) References Cited

U.S. PATENT DOCUMENTS

| | | | | |
|---|---|---|---|---|
| 5,808,919 | A * | 9/1998 | Preist et al. .................. | 702/183 |
| 6,029,195 | A | 2/2000 | Herz | |
| 6,519,552 | B1 * | 2/2003 | Sampath et al. ............. | 702/183 |
| 6,535,865 | B1 * | 3/2003 | Skaaning et al. ............ | 706/52 |
| 6,574,537 | B2 * | 6/2003 | Kipersztok et al. .......... | 701/31.8 |
| 6,601,055 | B1 * | 7/2003 | Roberts ........................ | 706/45 |
| 6,691,249 | B1 * | 2/2004 | Barford et al. ............... | 714/25 |
| 7,113,988 | B2 | 9/2006 | Chirashnya et al. | |
| 7,158,958 | B2 | 1/2007 | Przytula et al. | |
| 7,225,174 | B2 * | 5/2007 | Schreckengast et al. ...... | 706/45 |
| 7,251,640 | B2 | 7/2007 | Baumard | |
| 7,260,501 | B2 * | 8/2007 | Pattipatti et al. .............. | 702/183 |
| 7,328,200 | B2 * | 2/2008 | Przytula ........................ | 706/52 |
| 7,328,201 | B2 | 2/2008 | D'Ambrosio | |
| 7,536,277 | B2 * | 5/2009 | Pattipatti et al. .............. | 702/183 |
| 2004/0019575 | A1 | 1/2004 | Talbot et al. | |

(Continued)

FOREIGN PATENT DOCUMENTS

| | | |
|---|---|---|
| WO | WO 02/101555 | 12/2002 |
| WO | WO 2004/042493 | 5/2004 |

OTHER PUBLICATIONS

Fenton William_McGinnity TM_Maguire Liam, 2001, Fault Diagnosis of Electronic Systems Using Intelligent Techniques: A Review, IEEE Transactions on System, Man and Cybernetics-Part C, vol. 31, No. 3, pp. 269-281.*

(Continued)

*Primary Examiner* — Jonathan G Sterrett
*Assistant Examiner* — Stephen S Swartz
(74) *Attorney, Agent, or Firm* — Harness, Dickey & Pierce, P.L.C.

(57) ABSTRACT

In one embodiment, a method for troubleshooting a fault to determine a root cause of the fault. A Bayesian network model is created based on information obtained from a Fault Isolation Manual (FIM), where the FIM provides tests to be performed in troubleshooting the fault to determine a root cause of the fault. Heuristics are used to determine a structure and conditional probabilities for the Bayesian network. A plurality of test costs inherent in the FIM are imputed by first generating a plurality of constraints between the cost of each test and fault probabilities that hold for all fault scenarios. A linear programming algorithm is used to solve the plurality of constraints, and to construct a tuned Bayesian network model. The tuned Bayesian network model is used to iteratively rank likely faults according to their probabilities given accumulating test evidence, and to rank pending tests according to their value.

19 Claims, 4 Drawing Sheets

U.S. PATENT DOCUMENTS

| | | | |
|---|---|---|---|
| 2005/0015217 A1* | 1/2005 | Weidl et al. | 702/185 |
| 2005/0028033 A1* | 2/2005 | Kipersztok et al. | 714/27 |
| 2005/0043922 A1* | 2/2005 | Weidl et al. | 702/183 |
| 2005/0049988 A1* | 3/2005 | Dahlquist et al. | 706/46 |
| 2005/0114739 A1* | 5/2005 | Gupta et al. | 714/39 |

OTHER PUBLICATIONS

Steinder Malgorzata, and Sethi Adarshpal, 2004, A survey of fault localization techniques in computer networks, Science Direct, Science of Computer Programming, 53 (2004) pp (165-194).*

Rish Irina_Brodie Mark and Ma Sheng, 2002, Accuracy vs. Efficiency Trade-offs in Probabilistic Diagnosis, AAI-02 Proceedings, pp. 560-566 (hereafter Rish).*

Grove Ralph and Graham James, 2002, Multiple-Fault Diagnosis in Intelligent Controls Systems, 1996 IEEE International Symposium on Intelligent Control, pp. 212-217.*

Rish Irina_Brodie Mark and Ma Sheng, 2002, Intelligent probing: A cost-effective approach to fault diagnosis in computer networks, IBM Systems Journal, vol. 41, No. 3, pp. 372-373.*

Shayman Mark, Fernandez-Gaucherand Fernandez, 2001, Risk-Sensitive Decision-Theoretic Diagnosis, IEEE Transactions on Automatic Control, vol. 46, No. 7, pp. 1166-1171.*

Lerner Uri, Parr Ronald, Koller Daphne, Biswas Gautam, 2000, Bayesian Fault Detection and Diagnosis in Dynamic Systems, AAI00 Proceedings.*

Yongli Zhu, Limin Huo, and Jinling Lu, 2006, Bayesian Networks-Based Approach for Power Systems Fault Diagnosis, IEEE Transactions on Power Delivery, vol. 21, No. 2. pp. 634-639.*

Mittermayer, M. "Forecasting Intraday Stock Price Trends with Text Mining Techniques," Proceedings of the 37th Hawaii International Conference on System Sciences, IEEE, 2004, pp. 1-10.

Talbot, Patrick J. "Semantic Networks: A Unifying Framework for Multistrategy Reasoning," Technology Review Journal Spring/Summer 2003.

* cited by examiner

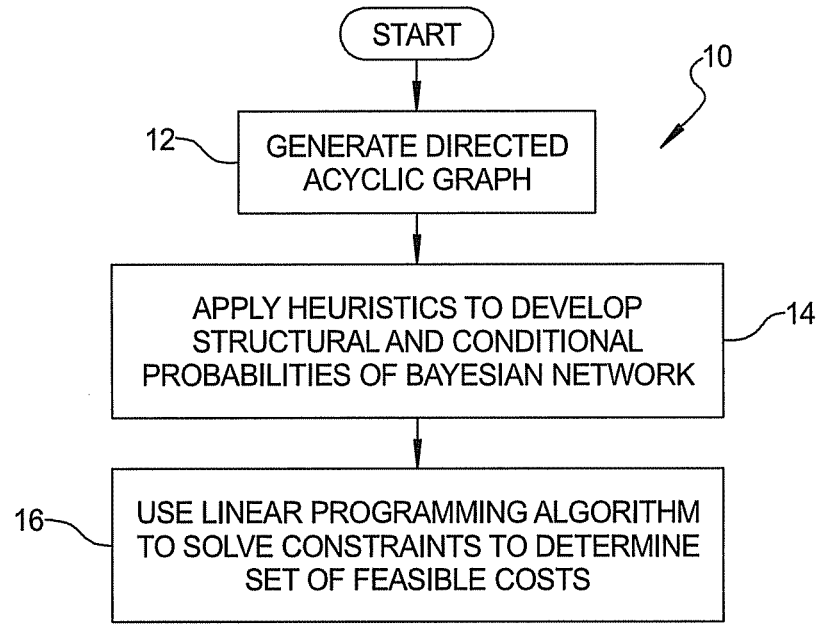
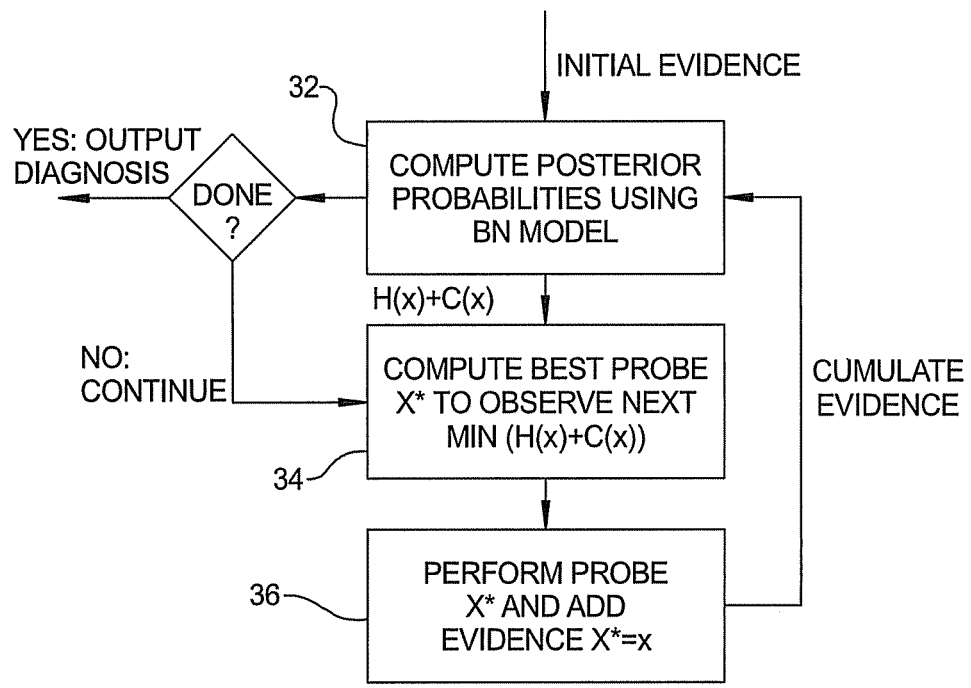

METHOD AND SYSTEM USING LINEAR PROGRAMMING FOR ESTIMATING TEST COSTS FOR BAYESIAN DIAGNOSTIC MODELS

FIELD

The present disclosure relates to diagnostic methods and systems, and more particularly to Bayesian diagnostic models that are used in diagnostic applications to assist in troubleshooting and isolating a component(s) responsible for a fault message, and in a manner that takes into account both the costs of the various tests that may be performed as well as the accuracy and specificity of different tests in identifying different faults, to produce a highly cost efficient troubleshooting procedure.

BACKGROUND

The statements in this section merely provide background information related to the present disclosure and may not constitute prior art.

When troubleshooting, a Fault Isolation Manual (FIM) can be an important tool, especially when highly complex aerospace or aircraft applications are involved. A FIM comprises a structured sequence of tests to identify the root-cause of fault messages, as reported by on-board diagnostic systems. The structured sequence of tests is based on knowledge of individuals involved with the components and subsystems being tested, as well as historical fault information of the components. The tests are designed to reduce failure ambiguity groups, for example sets of Line Replaceable Units (LRUs) that could have caused the fault message, and typically result in the identification of a single LRU as the root cause of the message. A significant limitation of a FIM is that the sequence of steps used for maintenance troubleshooting is static. Thus, even if an LRU is found to be unreliable, the test that implicates it is always carried out at the same predetermined stage in the test sequence. In aircraft applications, this may adversely impact the availability of an aircraft by requiring additional time to identify an LRU that is the cause of a given fault message. Accordingly, it would be highly desirable to dynamically structure testing in a more cost efficient manner.

SUMMARY

The method and system are directed to a Bayesian network that is especially well adapted for troubleshooting highly complex systems. The method and system enable an order of available troubleshooting tests to be generated based on the probability of success of each test in accurately and specifically identifying a fault, and taking into account the estimated costs for competing tests.

In one specific implementation the method of the present disclosure involves using a test sequence from an applicable Fault Isolation Manual (FIM) database to form a directed acyclic graph (DAG) of the test procedure. A structure for the Bayesian network is then developed based on the causality implied by the DAG derived from the FIM database. Conditional probabilities may be assigned to various nodes of the Bayesian network based on the local ordering of the test sequences in the DAG. Finally, a linear programming algorithm may be used to estimate the test costs that replicate the test sequence for all possible fault scenarios addressed by the FIM troubleshooting procedure.

In one specific implementation, the above-described operation of estimating the tests costs involves using constraints for the linear programming algorithm that are obtained by following different paths in the test procedure DAG derived from the FIM database. Each such path pertains to a different fault scenario, meaning a fault in a specific LRU and a particular sequence of test results. The constraints are used by the linear programming algorithm to determine the test costs for each test in the Bayesian network. The calculated test costs tune the Bayesian network in a manner that enables the tests to be ordered, for all possible fault scenarios implied by the FIM and encoded in the DAG, according to not only their probabilities of success, but also taking into account the cost of each available test. The linear programming algorithm thus determines a set of costs consistent with the DAG, provided that one such set of costs exists. The ranking of the tests provided by the methodology of the present application enables the troubleshooting/repair sequence for each specific fault/failure of a system to be carried in the most efficient manner, taking into account both the probabilities of success of a given test as well as the cost for each test.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 1 is a high-level description of an exemplary method according to an embodiment, starting from the Fault Isolation Model (FIM), its translation into a directed acyclic graph (DAG), the creation of the Bayesian network model, the tuning of the parameters of the Bayesian network, namely the conditional probabilities and test costs, the latter using a linear programming formulation, and finally using the tuned Bayesian networks for efficient troubleshooting of faults;

FIG. 4 is a flowchart setting forth the major operations performed by the methodology of the present application in using the tuned Bayesian model to create a ranked list of component faults and a prioritized list of tests, along with their values in most efficiently identifying the root cause of the fault message, according to an embodiment.

DETAILED DESCRIPTION

Figure 2:
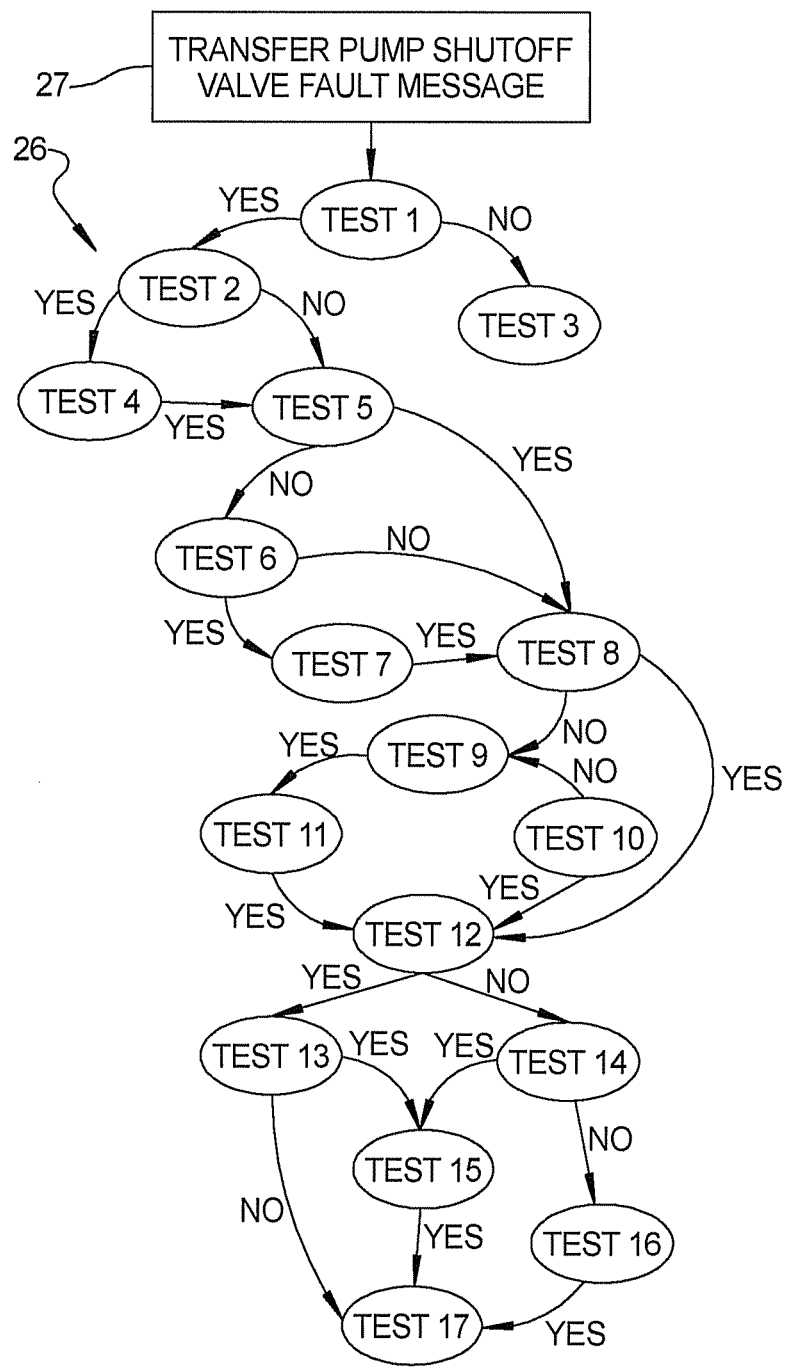
FIG. 2 illustrates an exemplary directed acyclic graph (DAG) associated with the structured representation of the troubleshooting process called for by a Fault Isolation Manual (FIM), for an exemplary fault message.

The following description is merely exemplary in nature and is not intended to limit the present disclosure, application, or uses. As used herein, the term "exemplary" identifies an example and not necessarily an ideal.

The method of the present disclosure is used to form Bayesian network models for performing troubleshooting and diagnostic tests on various types of systems to efficiently and cost effectively isolate and identify a component fault corresponding to a given fault message or code. While the method is not limited to use with any particular type of system, it is expected that the method will find particular utility in troubleshooting large, complex systems used in the aerospace industry, and particularly with systems used in commercial and military aircraft repair and maintenance. It will be appreciated, however, that the method of the present disclosure may be used with any type of mobile platform, whether the mobile platform is land based vehicle, a marine vessel or some other type of airborne vehicle. The method is also just as readily applicable to troubleshooting complex fixed (non-moving) equipment or systems, and therefore is not limited to use only with mobile platforms.

Referring to FIG. 1, In one implementation, the method of the present disclosure is designated by reference numeral 10, and initially involves using a test sequence encoded in a Fault Isolation Manual (FAM) to form a test directed acyclic graph (DAG), as indicated at operation 12. As will be explained more fully in the following paragraphs, the FIM is a pre-existing database of information that includes test procedures for troubleshooting a given fault message, for example a fault message from a subsystem of an aircraft having a plurality of Line Replaceable Units (LRUs).

At operation 14, the structure and conditional probabilities of the Bayesian network model may be developed based on the causality implied by the test DAG, guided by a set of heuristics. Specifically, the Bayesian network diagnostic model may have a fault node corresponding to each LRU, a test node corresponding to each diagnostic test node, and a logic node corresponding to each fault message. In one instantiation, the fault nodes have two states, namely 'Faulty' and 'OK, corresponding to whether the LRU has a fault or not'; the logic node has two states, namely 'Faulty' and 'OK', corresponding to whether the fault message indicates whether a fault message is indicated or not; the test nodes have two states, namely 'Yes' or 'No', corresponding to whether the answer to the follow-up question after the diagnostic test is performed.

The structure and conditional probabilities of the Bayesian diagnostic model preferably are developed by a knowledge engineer based on an understanding of the causalities in the system components and the associated diagnostic tests. The purpose of the heuristics is to assume as much information as is possible in automatically creating the Bayesian network that faithfully replicates the troubleshooting procedure encoded in the test DAG derived from the FIM, while minimizing hand-tuning of the model by the knowledge engineer. Otherwise, the development of Bayesian network models for legacy systems may be prohibitively expensive. A further goal of the heuristics is to ensure that the tuned model will behave similarly to changes in prior probabilities of faults in LRUs as would a hand-built Bayesian network with respect to diagnostic test sequencing and fault ranking.

One exemplary algorithm of this disclosure treats all the fault nodes as being the parents of the logic node, implying that the state of any LRU in the model has an impact on the state of the logic node. The first heuristic is to encode the logic node as a noisy max node, meaning that the probability of logic node indicating 'Fault' message is the maximum of the probabilities of 'Fault' in the parent LRU fault nodes. The prior probabilities of failure of the LRUs may be derived from historical data at the time of creation of the FIM.

The next important operation in the algorithm is to decide which LRU fault nodes to be connected to which test nodes—meaning which test results are impacted by which LRU fault. In this process, it should be first determined which nodes in the test DAG correspond to LRU faults and which nodes correspond to diagnostic tests. Every repair action is associated with an LRU fault. Another heuristic that is used in one instantiation of the disclosure is to treat all the leaf nodes in a test DAG as repair actions, as well as those nodes in a test DAG that have only one child. This corresponds to the question about whether the repair action made the fault go away. This implies that all the test nodes along a path from the root node to the repair action will be causally dependent on the fault in the LRU corresponding to the repair action. Another heuristic is to treat a test node that can reach a repair action corresponding to an LRU fault through multiple paths as not being causally dependent on the LRU fault node.

Another heuristic that may be used in this instantiation of the disclosure is to have the conditional probabilities of the states of the test nodes on the states of the fault nodes be farther apart if the test node is closer to the repair action in the test DAG. If the repair action is not a leaf node, then the conditional probabilities of the test states are closer together, implying that the test is not as specific or accurate in identifying a fault in the corresponding LRIU.

The diagnostic troubleshooting procedure preferably uses a combination of reduction in information entropy and test cost to rank order the diagnostic tests at any given state of evidence. The procedure preferably also orders the LRU by the likelihood of fault given the evidence gathered so far. The ordered lists of faults and tests may be presented to a display, for example an LCD or CRT display, at every step of the troubleshooting procedure. The technician can perform the test ranked highest and enter the evidence to the Bayesian network diagnostic system. The new evidence is used to reorder the LRUs according to updated fault probabilities and reorder the tests according to the combined measure of information entropy and cost. Accordingly, the technician can perform troubleshooting in the most cost and time efficient manner.

Before the troubleshooting procedure can be used, however, test costs need to be estimated. One exemplary algorithm that is used in the example instantiation is to follow each path in the test DAG, and at each node in the path, write constraints on the test value (combined measure of the reduction in information entropy and test cost) such that the next test implied by the test DAG is exactly the test that is ranked ahead of all other tests, based on the test value computed from the Bayesian network that is placed in an evidence state that corresponds to the specific path and node in the test DAG. These constraints are linear, and all the constraints so formed are then solved using a linear programming algorithm, as indicated at operation 16, the result of which is a set of feasible costs that ensure that the Bayesian diagnostic procedure will replicate the FIM order under default conditions.

When a feasible solution cannot be found, a relaxed LP formula is written and solved. This identifies a set of constraints that are violated. These constraints can then be used to identify the nodes in the Bayesian network whose conditional probabilities have to be adjusted from the default values.

Fault Isolation Module (FIM)

An exemplary FIM is presented in FIG. 2 and denoted by reference number 26. The FIM essentially consists of a structured representation of the troubleshooting process and can be represented as a DAG. FIG. 2 shows this test DAG 26 for an FIM associated with a "Transfer Pump Shutoff Valve" fault message. In the test DAG 26 in FIG. 2 the root node 27 represents the fault message or symptom. The first test that is recommended is Test1. If the outcome is 'Yes', then Test2 is recommended; if the outcome is 'No', Test3 is recommended. As Test3 does not have any outcomes, it implies that it is a repair/replace action, implicating a specific LRU fault. Further, it implies that the troubleshooting is complete. Some tests, such as Test15 and Test16, have only one response, 'Yes'. Based on the structure of the FIM, these tests are inferred to be a repair/replace operation followed by a test to verify if the fault message reappeared. In essence, an operation such as Test15 implicates a specific LRU fault (HSC2 as the failed component) as well, but the tests (Test13 and Test14) that lead to this implication are not infallible in their implication of the specific LRU. Therefore, troubleshooting proceeds to the next operation in the test DAG 26.

Bayesian Network Model

Figure 3:
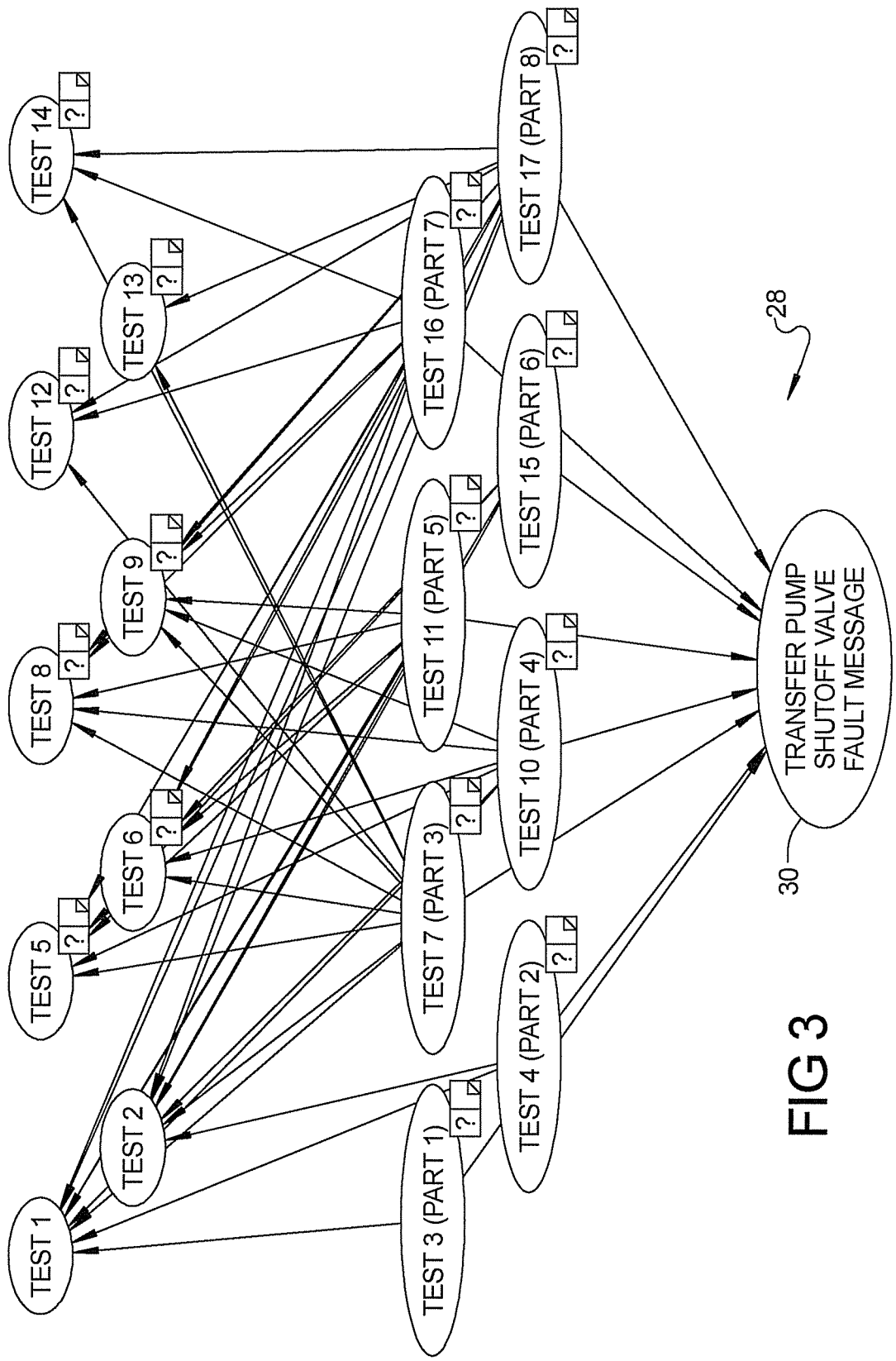
FIG. 3 is a representation of an exemplary Bayesian network generated from the DAG of FIG. 1, based on the FIM, according to one embodiment.

The foregoing described test DAG 26, the Bayesian network model of the FIM can now be generated. An exemplary Bayesian network model of the test DAG 26 is illustrated in FIG. 3 and denoted by reference numeral 28. It will be appreciated that the Bayesian model 28 is a bipartite graph, meaning the nodes in the network are of two categories: one representing the failure hypotheses (or LRUs faults) and the other representing the test outcomes or the fault message or symptom. There are arcs or edges connecting the nodes of different categories. Specifically, in a diagnostic Bayesian network, the arcs are directed from the LRU fault nodes to the test nodes. There will be a directed edge from a fault node to a test node, only if the state of the LRU fault node has a causal effect on the outcome of the test. In addition to this structure, a Bayesian network model is governed by a set of parameters. These parameters are the prior probabilities of all the LRU faults and the conditional probabilities of the outcomes of all test nodes conditioned on the fault state of the LRUs. The final set of parameters of a Bayesian diagnostic model are the test costs. The Bayesian network model of FIG. 3 is a representation of the FIM corresponding to the "Transfer Pump Shutoff Valve" fault message (FIG. 2). The prior probabilities of faults in various LRUs are initialized to default values, but can be changed during troubleshooting.

Bayesian Troubleshooting Procedure

As discussed above, It will be appreciated that the principal goal of a troubleshooting procedure is to offer a technician an optimal sequence of test operations to identify the root cause of the fault message or symptom. With the various implementations of the method of the present disclosure, an interactive and iterative troubleshooting procedure is presented that computes, at each operation of the troubleshooting process, two sets of information: (1) a ranked list of possible component faults, along with their associated probabilities, and (2) a prioritized list of troubleshooting tests available to the technician, along with their cost values.

FIG. 4 outlines the procedure for using the Bayesian network model of FIG. 3 for fault ranking and test ordering. Initial evidence (e.g., the "Transfer Pump Shutoff Valve" fault message) is asserted in the Bayesian model 28, at node 30 (FIG. 3). Assertion of this evidence means specifying that the probability of this message is 1.0. The model is then solved (using Bayes Rule) to compute updated probabilities for all the rest of the random variables, the fault probabilities of the component LRUs as well as the test outcomes, as indicated at operation 32. Any commercially available Bayesian network engine can be used for solving the model. One such commercially available Bayesian network engine is available from "SMILE" (i.e. Structural Modeling, Inference, and Learning Engine), developed at the University of Pittsburgh. The prioritized list of tests (including the test or probe to be performed first) is then determined at operations 34 and 36. This is done by solving an optimization problem that minimizes a combined measure of the test cost, "C(x)", and the value provided by the test, "x", in discriminating between the most likely fault and other less likely faults. This value of a test is estimated using an information entropy metric for the overall system. The entropy "H" of a system is given by the following expression:

$$H = -\sum_{h \in Hyp} p(h) \log p(h)$$

Here "p(h)" is the probability of the hypothesis, i.e., the probability that a particular LRU is at fault. For example, assume that by conducting the test, x, the system entropy falls from H0 to H(x). The gain from the test is thus H0−H(x). The test that has minimum cost and maximum value should be performed next. Often, the ratio of H(0)−H(x) to C(x) is the metric that is maximized. Other choices include minimizing the net cost, which is the difference between C(x) and H(0)−H(x). This latter choice results in an optimization problem whose objective is to minimize H(x)+C(x), as indicated in at operation 34.

Once the test with best combined value and cost metric is obtained at operation 36, the result of this test is once again asserted in the Bayesian model at operation 32, and the iterative procedure of operations 32-36 is repeated until the probability of any particular fault exceeds a pre-determined threshold (0.5, by default). During each iteration, instead of just providing the best test to perform next, the methodology of the present application provides a troubleshooting procedure that offers a prioritized list of tests (ranked according to test cost) as well as a ranked list of faults.

Constructing the Bayesian Network and Estimating its Parameters

The first operation in constructing the Bayesian network is to automatically identify the tests, repair actions, and the LRUs associated with these repair actions as described earlier. The next operation is to determine the set of directed edges (from the failure hypotheses to the tests). Once again, as described earlier, an arc is directed from a failure hypothesis or LRU fault node to the test node, if the LRU fault has a bearing on the test result as implied by the test DAG derived from the FIM. This operation is to estimate the prior probabilities of all the LRU faults and the conditional probabilities for all of the test nodes. To keep the problem tractable, it is preferable to develop a model that has a minimum number of edges and uses a minimum number of parameters to define the conditional probability tables in the network, while capturing the constraints inherent in the FIM model. Neither the probabilities nor the test costs are readily available for legacy systems, especially so in the aircraft industry. However, this information is inherently used in the construction of the legacy troubleshooting procedures as codified in the FIM. The method of the present disclosure uses the FIM to impute these parameters.

First, the prior probabilities may be set to default values estimated from historical failure data. The conditional probabilities are determined based on the heuristics described earlier. Finally, with the current disclosure, the test costs can be estimated in a highly effective manner using a suitable algorithm, and more preferably a linear programming algorithm. This is accomplished by assuming that the original FIM troubleshooting test order was developed by a domain engineer who used his/her system knowledge to come up with a sequence that implicitly took test costs and component reliability into account. As discussed earlier, this approach essentially uses the test ranking procedure described in FIG. 4 backwards to estimate the test costs such that when the imputed test cost parameters are added to the Bayesian network model, the FIM test sequence can be replicated for all possible faults.

As described earlier, the algorithm follows each path in the test DAG, and at each node in the path, writes constraints on the test value (combined measure of the reduction in information entropy and test cost) such that the next test implied by the test DAG is exactly the test that is ranked ahead of all other tests based on the test value computed from the Bayesian network that is placed in an evidence state that corresponds to the specific path and node in the test DAG. These constraints are linear, and all the constraints so formed may then be solved using a suitable algorithm, for example a linear programming algorithm. The result is a set of feasible costs that ensure that the Bayesian diagnostic procedure will replicate the FIM order under default conditions.

When a feasible solution cannot be found, a relaxed LP (linear programming) formula may be written and solved. This identifies a set of constraints that are violated. These constraints can then be used to identify the nodes in the Bayesian network whose conditional probabilities have to be adjusted from the default values before re-estimating the test costs.

Example Implementation

A particular advantage of the Bayesian network model approach is in automatically altering the test sequences offered to the maintenance technician, based on updated prior probabilities obtained, for example, from component failure rate data from the field. Thus, the Bayesian network model provides the capability to periodically update the parameters from which the test cost and ordered fault lists are generated.

Figure 5:
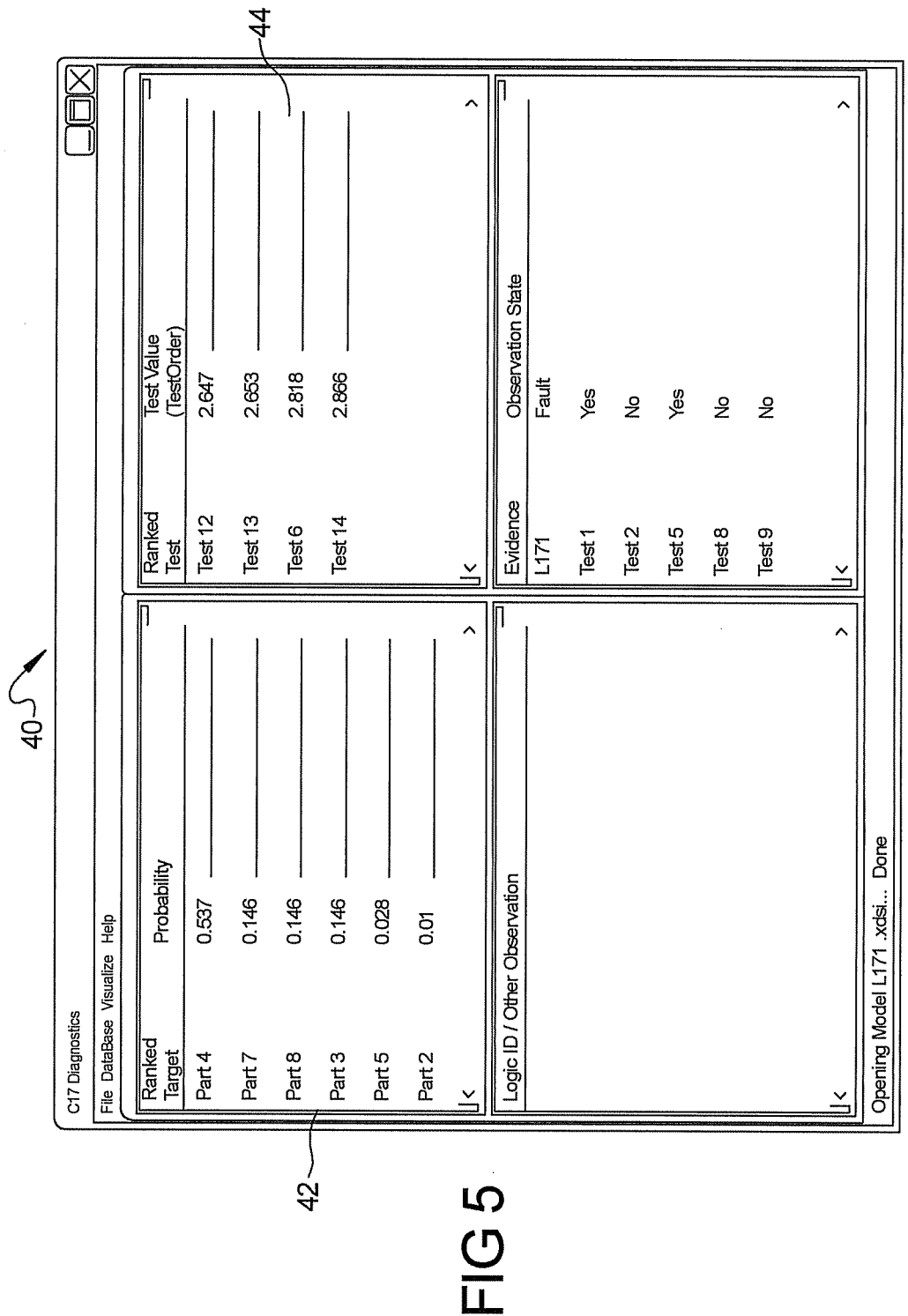
FIG. 5 is an illustration of an exemplary graphical user interface, in accordance with one embodiment, that may be used to display the ranked listing of tests along with the computed test values in increasing order of the their net costs, according to an embodiment.

FIG. 5 illustrates one example of a graphical user interface 40 that may be implemented on a suitable display, for example a CRT display or LCD. At any given stage of troubleshooting, the upper left pane 42 provides the list of components/LRUs according to the posterior fault probabilities based on the test evidence collected so far in the troubleshooting process. The faults are displayed from highest probability to lowest probability. By "faults", it is meant a specific part or subsystem, such as a particular LRU that is likely faulty. The upper right pane 44 provides the ordered list of tests, the ordering determined by a test value that is the sum of the test cost and the information entropy if the result of the specific test were available, ordered from lowest test value to highest test value. For example, it can be seen that Test 12 has a lower test value (i.e., 2.647), than Test 14 (having value 2.866), and therefore it is more efficient to perform Test 12 ahead of Test 14 at this stage in the troubleshooting procedure. Thus, at each operation of the troubleshooting process, the graphical user interface 40 can be used to present information to the technician that enables more efficient decision making to be used in selecting given tests and/or deciding on whether to replace a given component.

Scalability and Efficiency

The Bayesian network model and methodology of the present application also addresses the two challenges of scalability and efficiency in FIM modeling efforts. Scalability is an important requirement and ensures that the Bayesian network model we can handle very large models as are typical with aerospace and aircraft subsystems. Model schemes may be employed where the subsystem models are decomposed into small fragments and indexed so that relevant fragments can be easily retrieved to construct models in real time, based on the asserted failure messages being received. This means that only relevant portions of the subsystem being troubleshot are loaded into memory.

Efficiency in solving the Bayesian network model is also important to ensure that troubleshooting can be carried out in real-time. Bayesian network model execution time can be designed to meet typical user requirements by developing models with a minimum number of edges/arcs and minimum number of parameters to define the conditional probability tables in the network, while capturing the constraints inherent in the FIM.

Bayesian models further enable the combining of information from multiple fault messages for enhanced diagnostics.

Maintenance Cost Savings

The methodology of the present application, and the Bayesian network model that is constructed in accordance with the methodology, can provide significant maintenance cost savings for a variety of industries, and particularly for commercial and military airline operations. The reduction in the total number of repair steps for fault isolation (using the prioritized test list and ranked LRU faults) translates directly to a time and cost savings when performing a repair or maintenance operation. Another advantage of the methodology of the present application is that it is dynamic and effectively incorporates new information into its solution strategy as new information becomes available. Field maintenance data, repair effectiveness, aircraft parametric data, etc., can all be used to update model parameters, providing for an optimal maintenance strategy. For example, if particular LRUs are malfunctioning often, the LRU prior probabilities of failure for those specific LRUs may be updated to reflect this increased probability of failure. This feature can also positively impact other aspects of supply chain management, including logistics, parts ordering, etc.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for troubleshooting a fault to determine a root cause of the fault, the method comprising:
using a computer to create a Bayesian network model based on information obtained from a Fault Isolation Manual (FIM), where said FIM provides tests to be performed in troubleshooting said fault to determine a root cause of said fault;
using heuristics to determine a structure and conditional probabilities for the Bayesian network;
imputing a plurality of test costs to the computer which are inherent in the FIM by first generating a plurality of constraints between the cost of each test and fault probabilities that hold for all fault scenarios;
using a linear programming algorithm running on the computer to solve said plurality of constraints, and to construct a tuned Bayesian network model;
causing the computer to use the tuned Bayesian network model to compute, at each operation of the troubleshooting process:
a first set of information including a ranked list of possible component faults along with a probability associated with each one of said possible component faults, according to probabilities given accumulating test evidence, and a second set of information including a prioritized list of troubleshooting tests, along with a test value for each one of said troubleshooting tests, with the prioritized list of said trouble shooting tests being ranked according to their test value; and using the computer to simultaneously display on a display system, at each operation of the troubleshooting process:

the ranked list of possible component faults along with the probability associated with each one of said possible component faults;

said prioritized list of troubleshooting tests being in an ordered list on the display;

the test value determined for each one of said troubleshooting tests being displayed adjacent its associated one of the troubleshooting tests; and wherein each said test value further comprises a sum of information entropy, if a specific test outcome is known, and a test cost of a specific one of said tests.

2. The method of claim 1, further comprising displaying said test values from lowest to highest on said display.

3. The method of claim 1, further comprising using said Bayesian network model and imputed costs for each said available test called for in said Bayesian network model, to generate an ordered list of faults based on a probability of failure of each part of a system being troubleshot.

4. The method of claim 1, further comprising displaying said ordered list of faults in a list from highest probability of fault to lowest probability of fault.

5. The method of claim 1, wherein creating a Bayesian network model based on information obtained from the Fault Isolation Manual comprises initially creating a graph, based on said FIM, of a troubleshooting procedure for isolating a root cause of said fault.

6. The method of claim 5, wherein creating a graph comprises creating a directed acyclic graph (DAG) in accordance with troubleshooting procedures set forth in said FIM.

7. The method of claim 1, wherein using a linear programming algorithm comprises iteratively generating said costs for each said available test that may be performed in troubleshooting said fault.

8. A method for troubleshooting a fault to determine a root cause of the fault in a time and cost efficient manner, the method comprising:

using a computer to receive information from a Fault Isolation Manual (FIM) to form a graph of a test procedure to be carried out in troubleshooting the fault;

using the graph to construct a Bayesian network model based on a causality implied by the graph;

using heuristics to determine a structure and conditional probabilities for the Bayesian network;

imputing a plurality of test costs to the computer which are inherent in the FIM by first generating a plurality of constraints between the cost of each test and fault probabilities that hold for all fault scenarios;

using an algorithm running on the computer to solve said plurality of constraints, and to construct a tuned Bayesian network model;

causing the computer to execute the Bayesian network model to compute, at each operation of the troubleshooting process:

a first set of information including a ranked list of possible component faults along with a probability associated with each one of said possible component faults, according to probabilities given accumulating test evidence, and a second set of information including a prioritized list of troubleshooting tests, along with a test value for each one of said troubleshooting tests, with the prioritized list of said trouble shooting tests being ranked according to their test value; and using the computer to simultaneously display on a display system, at each operation of the troubleshooting process:

the ranked list of possible component faults along with the probability associated with each one of said possible component faults;

the ranked troubleshooting tests in an ordered list, together with their associated test values; and wherein each said test value further comprises a sum of information entropy, if a specific test outcome is known, and a test cost of a specific one of said troubleshooting tests.

9. The method of claim 8, further comprising generating a ranked list of faults based at least in part on probabilities associated with particular items of information imputed from the FIM.

10. The method of claim 8, wherein ranking said troubleshooting tests according to their value comprises calculating a total cost of each said available troubleshooting test using a linear programming algorithm, and constraints imposed by the available troubleshooting tests and order of said available troubleshooting tests, to solve for a total cost of each said available troubleshooting test.

11. The method of claim 8, further comprising using a total cost of each said available troubleshooting test to generate the ordered list of ranked troubleshooting tests for all of said troubleshooting tests set forth in said Bayesian network model.

12. The method of claim 11, further comprising displaying said ordered list of ranked troubleshooting tests from a lowest test value to a highest test value.

13. The method of claim 8, wherein forming a graph comprises forming a directed acyclic graph (DAG).

14. A method for troubleshooting a fault to determine a root cause of the fault in a time and cost efficient manner, comprising:

using a computer to receive information from a Fault Isolation Manual (FIM) to form a directed acyclic graph (DAG) of a test procedure comprising a plurality of tests to be carried out in a troubleshooting process for troubleshooting the fault;

causing the computer to use the DAG to construct a Bayesian network model based on the causality implied by the DAG;

using heuristics to determine a structure and conditional probabilities for the Bayesian network;

imputing a plurality of test costs inherent in the FIM by first generating a plurality of constraints between the cost of each test and fault probabilities that need to hold for all possible fault scenarios, and to rank each said test;

causing the computer to execute an algorithm to solve said plurality of constraints, and to construct a tuned Bayesian network model;

causing the computer to use the Bayesian network model to compute, at each operation of the troubleshooting process:

a first set of information including a ranked list of possible component faults along with a probability associated with each one of said possible component faults, according to probabilities given accumulating test evidence, and a second set of information including a prioritized list of troubleshooting tests, along with a test value for each one of said troubleshooting tests, with the prioritized list of said troubleshooting tests being ranked according to their test values; and using the computer to display on a display system, at each operation of the troubleshooting process:
the ranked list of possible component faults along with the probability associated with each one of said possible component faults;
the ranked troubleshooting tests in an ordered list along with their associated test values; and
wherein each said troubleshooting test further comprises a sum of information entropy, if a specific test outcome is known, and a test cost of a specific one of said troubleshooting tests.

15. The method of claim 14, wherein said faults are ranked in accordance with accumulating test evidence according to their value.

16. The method of claim 14, wherein said algorithm comprises a linear programming algorithm.

17. The method of claim 14, wherein displaying the ranked troubleshooting tests comprises displaying said ranked troubleshooting tests in an order from lowest test cost to highest test cost.

18. The method of claim 14, further comprising displaying a ranked order of possible component faults on a display, from most probable to least probable.

19. The method of claim 14, wherein the value of each said troubleshooting test is estimated using an information entropy metric H described by the expression;

$$H = -\sum_{h \in Hyp} p(h) \log p(h),$$

where p(h) is the probability of the hypothesis that a particular system element is at fault.

* * * * *